US011875792B2

(12) United States Patent
Decrop et al.

(10) Patent No.: US 11,875,792 B2
(45) Date of Patent: Jan. 16, 2024

(54) HOLOGRAPHIC INTERFACE FOR VOICE COMMANDS

(71) Applicant: International Business Machines Corporation, Armonk, NY (US)

(72) Inventors: Clement Decrop, Arlington, VA (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 17/445,288

(22) Filed: Aug. 17, 2021

(65) Prior Publication Data

US 2023/0059372 A1 Feb. 23, 2023

(51) Int. Cl.
*G10L 15/22* (2006.01)
*G03H 1/00* (2006.01)
*G01S 3/808* (2006.01)

(52) U.S. Cl.
CPC ............ *G10L 15/22* (2013.01); *G01S 3/8086* (2013.01); *G03H 1/0005* (2013.01); *G10L 2015/223* (2013.01); *G10L 2015/225* (2013.01)

(58) Field of Classification Search
None
See application file for complete search history.

(56) References Cited

U.S. PATENT DOCUMENTS

| 10,091,015 | B2  | 10/2018 | Kennedy |          |
|------------|-----|---------|---------|----------|
| 10,257,363 | B2* | 4/2019  | Mese    | H04W 4/80 |
| 11,183,181 | B2* | 11/2021 | Hartung | G10L 15/22 |
| 11,593,999 | B2* | 2/2023  | Mittleman | G08B 29/18 |
| 11,605,380 | B1* | 3/2023  | Houston | G06V 20/00 |
| 2012/0019674 | A1 | 1/2012 | Ohnishi et al. | |

(Continued)

FOREIGN PATENT DOCUMENTS

| CN | 104678359 B | 1/2017 |
| CN | 106358129 B | 6/2019 |

(Continued)

OTHER PUBLICATIONS

Mori et al., "Integrated virtual space control system utilizing hand gesture for intelligent house," Proceedings of SPIE, Oct. 2001, 12 pages.

*Primary Examiner* — Jonathan C Kim
*Assistant Examiner* — Jonathan Ernesto Amaya Hernandez
(74) *Attorney, Agent, or Firm* — Yee & Associates, P.C.

(57) ABSTRACT

A computer implemented method, computer system, and computer program product for executing a voice command. A number of processor units displays a view of a location with voice command devices in response to detecting the voice command from a user. The number of processor units displays a voice command direction for the voice command in the view of the location. The number of processor units changes the voice command direction in response to a user input. The number of processor units identifies a voice command device from the voice command devices in the location based on the voice command direction to form a selected voice command device. The number of processor units executes the voice command using the selected voice command device.

20 Claims, 7 Drawing Sheets

(56) References Cited

U.S. PATENT DOCUMENTS

| | | | | |
|---|---|---|---|---|
| 2012/0330659 | A1* | 12/2012 | Nakadai | G10L 21/06 |
| | | | | 704/E15.044 |
| 2017/0032141 | A1* | 2/2017 | Hungate | H04W 4/021 |
| 2017/0061694 | A1* | 3/2017 | Giraldi | G06F 3/16 |
| 2018/0233145 | A1* | 8/2018 | Bathiche | H04N 21/44222 |
| 2020/0072937 | A1* | 3/2020 | Baek | H04R 1/406 |

FOREIGN PATENT DOCUMENTS

| | | |
|---|---|---|
| JP | 5250089 B2 | 4/2013 |
| KR | 20150140807 A | 12/2015 |

* cited by examiner

HOLOGRAPHIC INTERFACE FOR VOICE COMMANDS

BACKGROUND

1. Field

The disclosure relates generally to an improved computer system and more specifically to processing voice commands using computer system with a holographic interface.

2. Description of the Related Art

Artificial intelligence assistance systems using voice user interfaces on smart devices provide users with access to a digital assistant from virtually any location where a smart device is located. Smart devices such as smart speakers employ speech recognition to perform tasks or execute commands from a user. The digital assistant replies to queries or questions, provide entertainment, play music, present information, provide assistance, control other devices, or perform other tasks through voice user interface.

Multiple smart devices can be present in a location such as in a house or office to form a multi-device ecosystem at that location. Some devices, such as smart speakers can detect voice commands and verbally respond to voice commands. Other devices such as a thermostat name detect voice commands but perform actions such as changing the temperature instead of providing a verbal response.

With multi-device ecosystems, different types of smart devices can be present in the location. With different types of smart devices, the same command can be executed at the same time by different devices. Depending on the type of devices executing a command, the same or different result can occur.

SUMMARY

According to one illustrative embodiment, a computer implemented method executes a voice command. A number of processor units displays a view of a location with voice command devices in response to detecting the voice command from a user. The number of processor units displays a voice command direction for the voice command in the view of the location. The number of processor units changes the voice command direction in response to a user input. The number of processor units identifies a voice command device from the voice command devices in the location based on the voice command direction to form a selected voice command device. The number of processor units executes the voice command using the selected voice command device. According to other illustrative embodiments, a computer system and computer program product for executing a voice command are provided.

DETAILED DESCRIPTION

Figure 1:
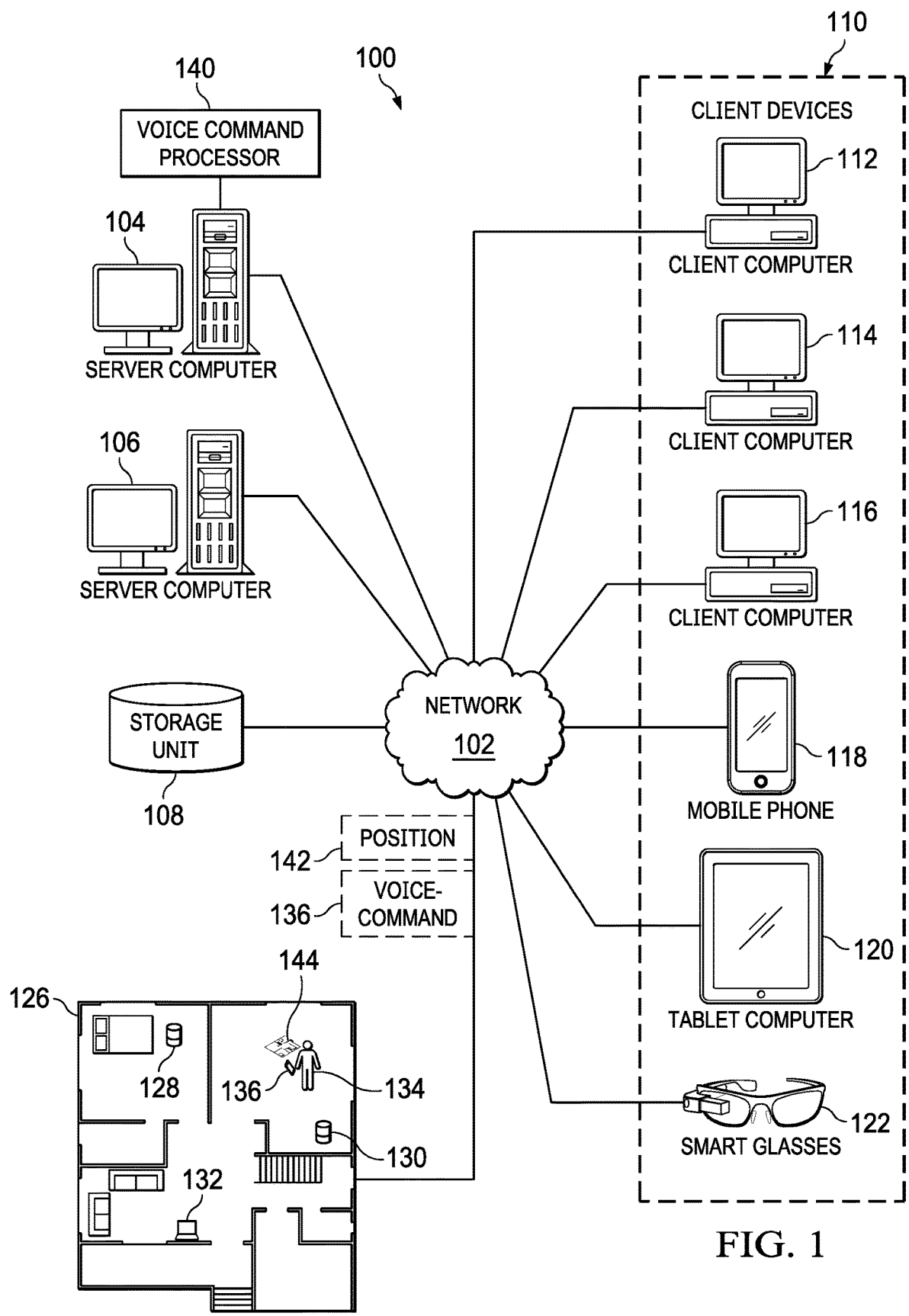
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that in some instances it may be undesirable for multiple smart devices to process the same command at the same time. For example, the illustrative embodiments recognize and take into account that a user may issue a command to play music in a location, such as a house. The illustrative embodiments recognize and take account that this command may be processed by two smart devices in two different rooms. As a result, the illustrative embodiments recognize and take into account that music may be in the two different rooms in which the two smart devices are located. However, the illustrative embodiments can recognize and take account that playing music in one of the two rooms may be undesirable. For example, the illustrative embodiments recognize and take into account that a person may be sleeping or studying in a room when music is played from processing the command and that playing music in that room is undesirable.

Therefore, it would be desirable to have a method and apparatus that take into account at least some of the issues discussed above, as well as other possible issues. For example, it would be desirable to have a method and apparatus that overcome a problem with the processing of commands by multiple smart devices in a location. Thus, the illustrative embodiments provide a method, apparatus, system, and computer program product for processing voice commands. A number of processor units displays a three-dimensional view of a location with voice command devices in response to detecting a voice command from a user. The number of processor units displays a voice command direction for the voice command in the three-dimensional view of the location. The number of processor units changes the voice command direction in response to a user input. The number of processor units identifies a voice command device from the voice command devices in the location based on the voice command direction to form a selected voice command device, and processes the voice command using the selected voice command device.

As used herein, "a number of" when used with reference to items, means one or more items. For example, "a number of processor units" is one or more processor units.

Thus, illustrative embodiments provide a computer implemented method, computer system, and computer program product for executing a voice command. A number of processor units displays a view of a location with voice command devices in response to detecting the voice command from a user. The number of processor units displays a voice command direction for the voice command in the view of the location. The number of processor units changes the voice command direction in response to a user input. The number of processor units identifies a voice command device from the voice command devices in the location based on the voice command direction to form a selected voice command device. The number of processor units executes the voice command using the selected voice command device.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wire, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, house 126 has a number of different rooms in which voice command devices are present. Voice command devices can be any device capable of providing a voice user interface to process commands. In the illustrative example, voice command devices can be computing devices such as smart speaker 128, smart speaker 130, and smart television 132 in house 126. These devices can be IoT devices similar to client devices 110.

In this illustrative example, user 134 is a person who may speak to generate a voice command 136. In this illustrative example, voice command 136 may can be detected by at least one of smart speaker 128, smart speaker 130, smart television 132, or smart phone 138 carried by user 134. Voice command 136 can be sent to voice command processor 140 over network 102. In this illustrative example, voice command 136 can be in a recording of the voice of user 134. Voice command processor 140 can use various processes such as speech recognition algorithms, natural language processing, or other voice processing algorithms to identify voice command 136 in the recording for execution.

Additional information such as position 142 of user 134 can be sent to voice command processor 140 over network 102. Position 142 can be determined in a number of different ways. For example, position 142 can be determined using a global positioning system in smart phone 138 carried by user 134.

Position 142 of user 134 can then be a three-dimensional location of user 134 within house 126. In this illustrative example, position 142 of user 134 can be three-dimensional coordinates in a three-dimensional coordinates system. Additionally, the position 142 of user 134 can also include a direction or facing for user 134.

As depicted, voice command processor 140 can cause a three-dimensional view of house 126 in the form of a holographic interface 144 to be displayed by smart phone 138. As depicted, position 142 of user 134 can be used to determine where the user 134 is located in house 126. With this determination, voice command processor 140 can cause a three-dimensional view of house 126 to be displayed to user 134 on smart phone 138.

In this illustrative example, smart phone 136 has a holographic display that can produce a virtual three-dimensional imaging space. In another illustrative example, the three-dimensional view of house 126 can be a three-dimensional image displayed on a display in smart phone 138 instead of a holographic projection.

Holographic interface 144 is a hologram that can receive user input. In this illustrative example, holographic interface 144 is a display of a three-dimensional view of house 126 that can include a graphic indicating a voice command direction for voice command 136. This voice command direction can be determined by voice command processor 140 using a simulation model for house 126 and the position of user 134.

In this illustrative example, the voice command direction can indicate a voice command device that will execute voice command 136. User 134 can change the voice command direction to select a different voice command device. For example, user 134 can interact with holographic interface 144 displayed by smart phone 138 to change the voice command direction for voice command 136. For example, the voice command direction can be made to identify smart speaker 130 as the device used to execute voice command 136. User 134 can interact with holographic interface 144 to change the voice command direction to identify smart television 132.

In this manner, user 134 can define where voice command 136 is to be executed before voice command 136 is executed. In other words, user 134 can change the voice command direction such that the different voice command device executes voice command 136 in place of the voice command device initially identified by the force command direction as seen in holographic interface 144.

User 134 can then initiate the execution of voice command 136 using the voice command device identified by the voice command direction. Voice command processor 140 then executes voice command 136 using the voice command device identified by the voice command direction. For example, if the voice command direction selects smart television 132, then voice command processor 140 executes voice command 136 using smart television 132. As result, smart television 132 is the voice command device that executes voice command 136 generated by user 134.

Additionally, voice command processor 140 can learn over time and adapt to user input from user 134. For example, if each time the voice command direction is shown to be smart speaker 130 with user 134 facing smart speaker 130 in the dining room and user 134 changes the voice command direction to smart television 132, voice command processor 140 can adapt to identify the voice command direction has been to smart television 132 even though user 134 is in the dining room and faces smart speaker 130. This adaptation can be made after some number of times that user 134 changes the voice command direction. The adaptation can wait to ensure that user 134 consistently desires the voice command direction to execute the voice command using smart television 132. Further, this adaptation for generating the voice command direction can be for a particular voice command in these illustrative examples.

The illustrative example in FIG. 1 is only provided as one implementation and not meant to limit the implementation of other result examples. For example, other numbers of voice command devices can be present in addition to or in place of smart speaker 128, smart speaker 130, and smart television 132. For example, other voice command devices can include a smart refrigerator, a smart thermostat, or other devices capable of implementing a voice command interface. In another illustrative example, the display of the holographic interface can be performed using other types of devices in addition to or in place of smart phone 138. For example, laptop computer, a tablet PC, or other smart devices operated by user 134 can be used to display a hologram of house 126 through holographic interface 144.

As yet another example, holograms can be displayed through holographic interface 144 for other locations in addition to or in place of house 126. For example, the holographic interface can display a hologram for an office, shop, or other suitable location in which user 134 may be positioned.

For example, position 142 of user 134 can be determined by the different smart devices in house 126 based on detecting wireless signals from smart phone 138.

In yet other illustrative examples, position 142 can be determined by other devices carried by user 134. The device can be carried by user 134 when user 134 holds or wears the device. The device can be any electronic device that is capable of determining its position and communicating its position to other devices. For example, the device can be a smart device, which is an electronic device that is in communication with other devices using wireless communication links such as Wi-Fi, Bluetooth, Zigbee, 5G, or other types of communication links. Bluetooth is a registered trademark of Bluetooth SIG, Zigbee is a registered trademark of Zigbee Alliance. When a device is carried by user 134, the position of the device is considered to be the position of user 134.

In yet another illustrative example, holographic interface 144 can be displayed by other devices other than or in addition to smart phone 138. For example, holographic interface 144 can be displayed by a smartwatch or other wearable carried by user 134. As another illustrative example, holographic interface 144 can be displayed by a laptop computer, a tablet computer, or other suitable device.

Figure 2:
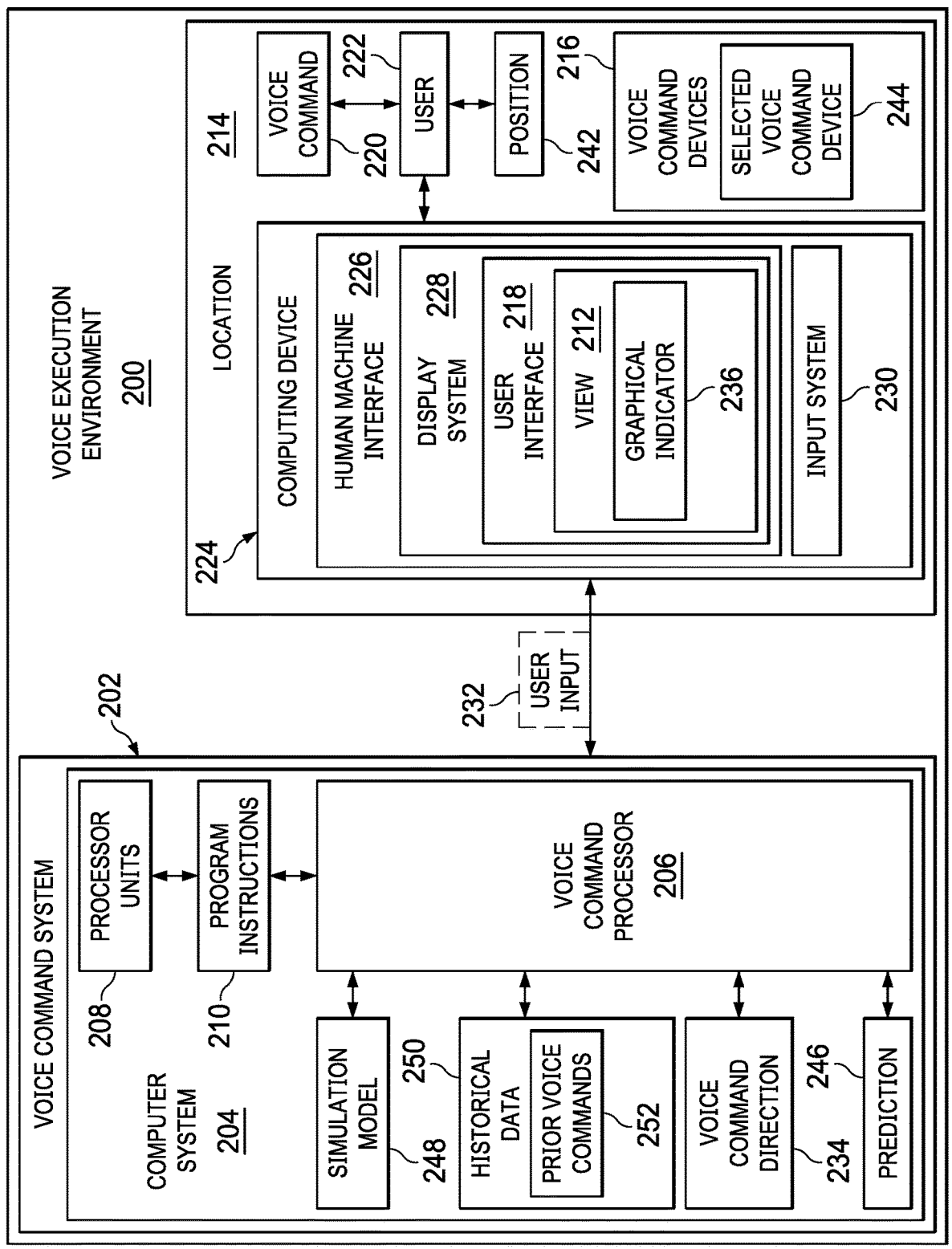
FIG. 2 is a block diagram of a voice execution environment in accordance with an illustrative embodiment.

With reference now to FIG. 2, a block diagram of a voice execution environment is depicted in accordance with an illustrative embodiment. In this illustrative example, voice execution environment 200 includes components that can be implemented in hardware such as the hardware shown in network data processing system 100 in FIG. 1.

In this illustrative example, voice commands can be processed in voice execution environment 200 by voice command system 202. As depicted, voice command system 202 comprises computer system 204 and voice command processor 206.

Voice command processor 206 can be implemented in software, hardware, firmware or a combination thereof. When software is used, the operations performed by voice command processor 206 can be implemented in program instructions configured to run on hardware, such as a processor unit. When firmware is used, the operations performed by voice command processor 206 can be implemented in program instructions and data and stored in persistent memory to run on a processor unit. When hardware is employed, the hardware may include circuits that operate to perform the operations in voice command processor 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes a number of processor units 208 that are capable of executing program instructions 210 implementing processes in voice command processor 206 when voice command processor 2068 includes software. As used herein, a processor unit in the number of processor units 208 is a hardware device and is comprised of hardware circuits such as those on an integrated circuit that respond and process instructions and program code that operate a computer. When a number of processors units 208 execute instructions for a process, the number of processors units 208 is one or more processors units that can be on the same computer or on different computers. In other words, the process can be distributed between processors units on the same or different computers in a computer system. Further, the number of processors units 208 can be of the same type or different types of processors units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, voice command processor 206 implemented computer implemented method for executing voice commands. Voice command processor 206 can display view 212 of location 214 in user interface 218 in response to detecting voice command 220 from user 222. Further, the display view 212 of location 214 in user interface 218 can also include a display of voice command devices 216 present in location 214.

In this illustrative example, view 212 can take a number of different forms. For example, view 212 can be selected from at least one of three-dimensional view, a hologram a three-dimensional image, a two-dimensional view, or two-dimensional image, or some other suitable view of location 214.

Location 214 can also take a number of different forms. For example, location 214 can be one of is one of a house, a floor in the house, a room, an office, a work area in a building, a store, a warehouse, a manufacturing floor or some other suitable location. Voice command devices 216 can be selected from at least one of an IoT device, smart device, a remote control, a television, a smart speaker, a smartphone, a refrigerator, or some other device that is capable of detecting the sound of speech from user 222 for processing voice commands.

In this example, user interface 218 can be displayed on computing device 224. In other words, voice command processor 206 can display view 212 using computing device 224. Voice command processor 206 can send view 212 to computing device 224 to be displayed in user interface 218 in computing device 224.

Computing device 224 can be a device used by user 222. For example, computing device 224 can be carried by user 222 and can be one of a smart phone, a smartwatch, a tablet computer, a laptop computer, a wearable device, or some other computing device that is capable of displaying user interface 218 with view 212 of location 214. In another illustrative example, computing device 224 can be in a location proximate to user 222 that can be seen by user 222 in location 214. For example, computing device 224 can also be one of a desktop computer, a smart television, or some other suitable type of computing device.

In this example, computing device 224 includes human machine interface 226. Human machine interface 226 is a hardware system and can also include software. In this illustrative example, human machine interface 226 comprises display system 228 and input system 230. Display system 228 is a physical hardware system and includes one or more display devices on which user interface 218 can be displayed. The display devices can include at least one of a holographic display, a head mounted holographic display, a light emitting diode (LED) display, an organic light emitting diode (OLED) display, a projector, a flat panel display, a heads-up display (HUD), or some other suitable device that can output information for the visual presentation of information.

User 222 is a person that can interact with user interface 218 through user input 232 generated by input system 230 for computing device 224. Input system 230 is a physical hardware system and can be selected from at least one of a touchscreen, a motion sensing input device, a gesture detection device, a cyber glove, a stylus, a mouse, a keyboard, a trackball, or some other suitable type of input device.

Voice command processor 206 displays voice command direction 234 for the voice command in view 212 of location 214. The display of voice command direction 234 is displayed within view 212 of location 214 enables user 222 to visually see which voice command device in voice command devices 216 is currently identified for executing voice command 220. Voice command direction 234 can be visualized in view 212 using graphical indicator 236. For example, voice command processor 206 can display graphical indicator 236 in view 212 that indicates the voice command direction 234. Graphical indicator 236 can include one or more graphical elements.

Graphical indicator 236 for voice command direction 234 can be a starting point for voice command direction 234 and an ending area for voice command direction 234. In this illustrative example, the starting point can be from position 242 of user 222 in location 214. The ending area can be the position of selected voice command device 244 in voice command devices 216 in location 214. In other illustrative examples, the ending area can be proximate to a voice command device. This starting point and ending area in graphical indicator 236 can be a cone. Additionally, graphical indicator 236 can include other graphical elements such as text of the name of the voice command device.

Graphical indicator 236 can take other forms in other illustrative examples. For example, graphical indicator 236 can be a line, a line with an arrow pointing to a voice command device, text, an icon, highlighting, or other suitable forms. In yet another illustrative example, graphical indicator 236 for voice command direction 234 can be a graphical element associated with a voice command device. For example, graphical indicator 236, or a graphical element in a graphical indicator can be considered to be associated with selecting a voice command device in voice command devices 216 when the graphical indicator 236 is displayed in a manner that draws attention to a voice command device displayed in view 212 of location 214. The graphical elements can be an icon, text, flashing text, or other suitable indicators.

In this illustrative example, voice command processor 206 can change the voice command direction 234 in response user input 232. For example, user 222 can make a gesture to move voice command direction 234 from one voice command device to another voice command device in voice command devices 216. In yet another illustrative example, user 222 may operate a stylus, use a touchscreen, or some other device to change voice command direction 234 to select a different voice command device for executing voice command 220.

Additionally, voice command processor 206 can receive user input 232 that edits voice command 220 for execution using selected voice command device 244. For example, user input 232 can edit voice command 220 to change a first song requested in voice command 220 to a second song. In yet another illustrative example, user input 232 can edit voice command 220 to change a temperature for an air conditioning unit from one value to another value. In another illustrative example, user input 232 can edit voice command 220 from playing an audio file to display a video file.

Voice command processor 206 can identify a voice command device from the voice command devices 216 in location 214 based on voice command direction 234 to form selected voice command device 244. Voice command processor 206 can execute voice command 220 using selected voice command device 244.

In this illustrative example, voice command processor 206 can determine voice command direction 234 in a number of different ways. For example, voice command processor 206 can determine voice command direction 234 for voice command 220 based on prediction 246 of voice command direction 234 using position 242 of user 222 in location 214. In this example, prediction 246 can include determining the direction of voice command 220 based on the detection of the user's voice by voice command devices 216. These voice command devices function as a sensor array. Beamforming technology can be used to determine the origination and direction of voice command 220. Beamforming is a signal processing technique. With this technique, a microphone array is used to form a spatial filter which can extract a signal from a specific direction and reduce the contamination of signals from other directions.

Based on the actual direction of voice command 220, simulation model 248 can be used to determine whether that direction should be used or whether another direction should be used based on historical data 250. For example, a user sitting at a desk may generate a voice command to play music. The voice command direction 234 may be directed towards a television in front of user 222. However, user 222 may desire to have the music played by a smart speaker located behind user 222. Based on corrections to the voice command direction and historical data 250, simulation model 248 can determine that even though the direction of the voice command as detected by voice command device 216 is towards the smart television, voice command direction 234 should actually be to the smart speaker located behind user 222.

As depicted, voice command processor 206 can predict voice command direction 234 for voice command 220 using simulation model 248 and position 242 of user 222 to form prediction 246 of voice command direction 234. Prediction 246 of voice command direction 234 can include a voice command device for executing the voice command 220 and a set of actions to be performed for voice command 220. As used herein, "a set of" when used with reference to items means one or more items. For example, a set of actions can be one or more actions. In this illustrative example, the actions can include at least one of responding to an inquiry, activating a device, changing a device setting, playing an audio file, playing a video, or other suitable actions.

Simulation model 248 can be created using historical data 250 of prior voice commands 252.

Simulation model 248 can take a number of different forms. For example, simulation model 248 can be an artificial intelligence system, machine learning model, a knowledge-based model, or some other suitable model. An artificial intelligence system is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

A machine learning model is a type of artificial intelligence model that can learn without being explicitly programmed. A machine learning model can learn based training data input into the machine learning model. The machine learning model can learn using various types of machine learning algorithms. The machine learning algorithms include at least one of a supervised learning, and unsupervised learning, a feature learning, a sparse dictionary learning, and anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

Additionally, voice command processor 206 can update historical data 250 for prior voice commands 252 with the voice command direction 234 used to execute the voice command 220 in which voice command direction 234 was selected in response to user input 232. In this example, simulation model 248 can be further trained using historical data 250 with the updates to predict the voice command direction 234 for voice command 220. With this additional training, simulation model 248 can more accurately predict voice command direction 234 when receiving voice command 220 and position 242 of user 222.

In one illustrative example, one or more solutions are present that overcome a problem with executing voice commands in a desired manner. As a result, one or more illustrative examples can render a view of the physical surrounding around the user in a location and a visual bisection of the direction of the voice command in the view. One or more illustrative examples can predict the direction of the voice command and identify a particular voice command device for executing the voice command. The user can determine whether to accept the predicted voice command direction to interact with the view to change the voice command direction such that another voice command device executes the voice command. In one or more illustrative examples, the user can also change the voice commands prior to the execution of the voice command. Further, in one or more illustrative examples, the selection of voice command devices and the display view can be selected based on which location the user is present.

Computer system 204 can be configured to perform at least one of the steps, operations, or actions described in the different illustrative examples using software, hardware, firmware or a combination thereof. As a result, computer system 204 operates as a special purpose computer system in which voice command processor 206 in computer system 204 enables managing execution of voice commands from a user in a location. In particular, voice command processor 206 transforms computer system 204 into a special purpose computer system as compared to currently available general computer systems that do not have voice command processor 206.

In the illustrative example, the use of voice command processor 206 in computer system 204 integrates processes into a practical application for executing voice commands that increases the performance of computer system 204. In other words, voice command processor 206 in computer system 204 is directed to a practical application of processes integrated into voice command processor 206 in computer system 204 that displays a view of a location to a user, displays a visualization of the direction of the voice command using a graphical indicator, enables the user to interact with the graphical indicators in the view to change the direction of the voice command such that a desired voice command device is selected for executing the voice command, and executes the voice command using a desired voice command device.

The illustration of voice execution environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, voice command processor 206 running in computer system 204 is shown as a separate component from computing device 224 in this functional block diagram. In this implementation, voice command processor 206 can be such that program instructions 210 for this component run on one or more processor units in computing device 224 used by user 222. In other illustrative examples, voice command processor 206 can run on a server computer or be distributed among several computers in computer system 204.

As another example, one or more command directions can be identified in addition to voice command direction 234. The one or more additional voice command directions can be displayed in view 212 using one or more graphical indicators in addition to graphical indicator 236. As result, user 222 can decide to execute voice command 220 using more than one voice command device in voice command devices 216.

Figure 3:
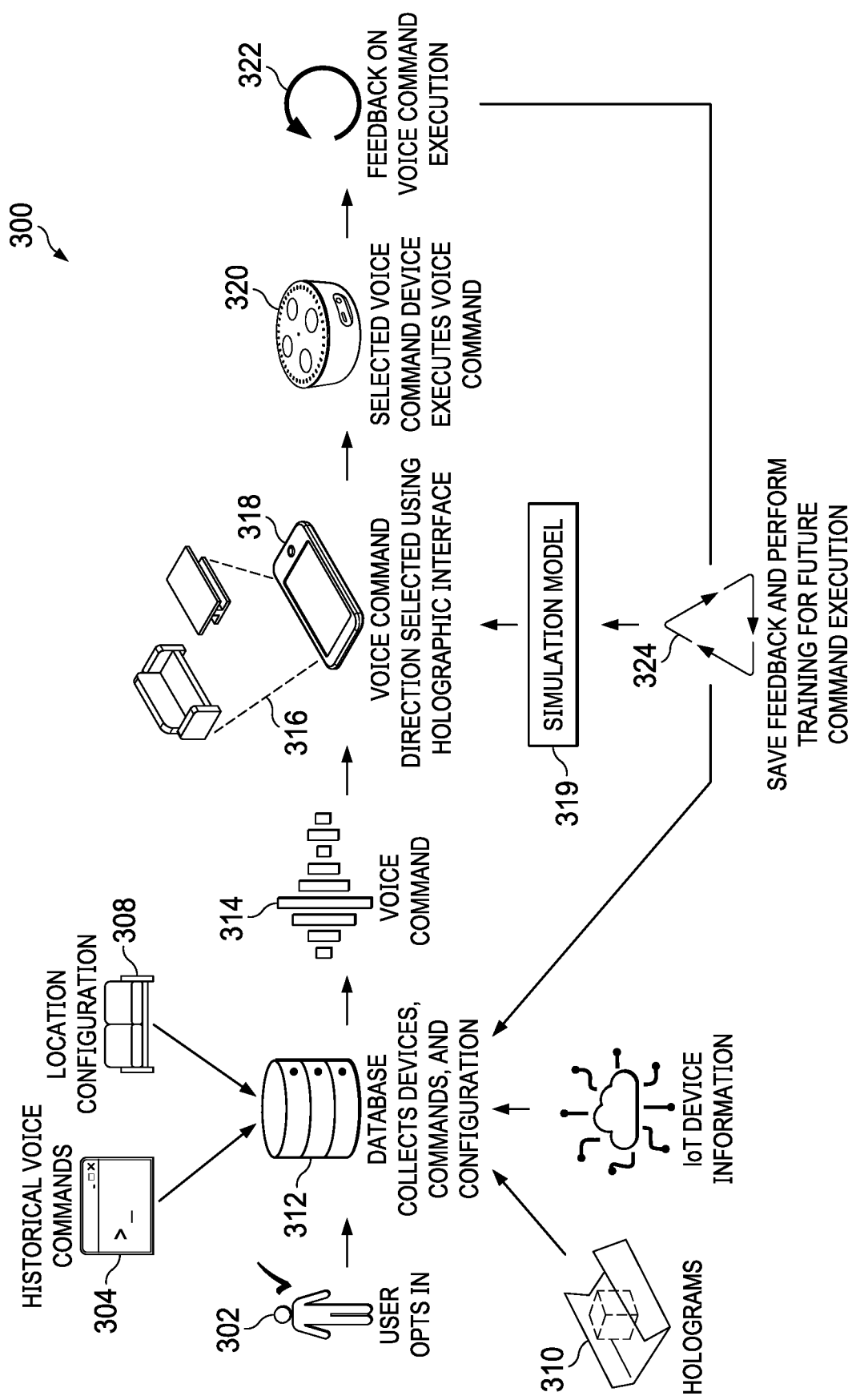
FIG. 3 is a process flow diagram for executing voice commands in accordance with an illustrative embodiment.

With reference to FIG. 3, a process flow diagram for executing voice commands is depicted in accordance with an illustrative embodiment. Process flow 300 can be implemented in hardware, software, or both. When implemented in software, the process can take the form of program instructions that is run by one of more processor units located in one or more hardware devices in one or more computer systems. For example, the process can be implemented in using the different components illustrated in FIG. 1 and FIG. 2.

As depicted, process flow 300 begins with user 302 opting into using voice command management. In this example, process flow 300 collects historical voice commands 304 and IoT device information 306.

In this example, historical voice commands 304 are voice commands previously made by user 302. These voice commands made by user 302 can be saved as historical voice commands 304. Historical voice commands 304 can include information about how voice commands are submitted, what type of voice commands are submitted, which devices are executing the voice commands, and other information about the voice commands made by user 302.

IoT device information 306 is information about voice command devices that are to be used for executing voice commands by user 302. In this illustrative example, IoT device information 306 is for IoT devices registered by user 302. Each IoT device can be uniquely identified in IoT device information 306 for executing voice commands. identifying IoT device information also includes the position of each IoT device.

Additionally, the process flow also determines location configuration 308 for a location in which IoT devices are located. In this example, location configuration 308 includes information about dimensions of the physical surrounding where voice commands will be executed by IoT devices. Location configuration 308 can be for a number of locations. Location configuration 308 can be used by process flow 300 to generate a number of holograms 310. A holograph in holograms 310 is created for each location in location configuration 308. As depicted, historical voice commands 304, IoT device information 306, location configuration 308, and hologram 310 are stored in database 312.

As depicted, voice command 314 is a trigger for process flow 300 to display a hologram from holograms 310 in holographic interface 316 by smart phone 318. The hologram selected from holograms 310 for display is for the current location in which user 302 is located. The location of user 302 can be determined by smart phone 318 or some other wearable smart device worn by user 302 in this illustrative example. This location can be used to identify and display a hologram in holographic interface 316.

In displaying holographic interface 316, a voice command direction is displayed within a hologram in holographic interface 316. In this illustrative example, the voice command direction can be predicted using simulation model 319. Simulation model 319 can predict the voice command direction identifying the position of user 302 and using an audio sensor system provided by different voice command devices. The audio sensor system can be used to detect the origination and direction of the voice command generated by user 302.

The voice command direction can also be based on historical voice commands 304. For example, simulation model 319 can be a machine learning model trained using historical voice commands 304.

As result, user 302 can visualize the entire surrounding in the location by viewing holographic interface 316 that displays the hologram. In addition, user 302 can also visualize the voice command direction within the hologram through a graphical indicator displayed in the hologram to identify the direction of the voice command.

User 302 can select the voice command direction by interacting with holographic interface 316. For example, user 302 can manipulate the graphical indicator providing the visualization of the voice command direction to change the voice command direction. The change in the voice command direction can select a different voice command device to execute the voice command. As result, holographic interface 316 enables user 302 to selectively execute a voice command in a location by selecting the voice command direction where the voice command is to be executed. In this manner, user 302 can perform directional command generation. The voice command direction identified a voice command device that is selected for executing the voice command.

In response to user 302 selecting the voice command direction, process flow 300 executes the voice command using selected voice command device 320 identified by the voice command direction. In this example, executing the voice command using selected voice command device 320 means that selected voice command device 320 provides the response to reply. For example, selected voice command device 320 will play music, provide weather information, confirm execution of a task such as turning on a light, lower a temperature, or other response.

Process flow 300 can also receive input 322 for feedback 324 on the voice command execution by selected voice command device 320. Feedback 324 can indicate whether selected voice command device 320 was the correct voice command device for executing the voice command. Feedback 324 can also be inferred based on whether user three zero to changes the voice command direction in holographic interface 316. For example, if user does not change the voice command direction, then selected voice command device 320 identified by the voice command direction is the correct device. If the user changes the voice command direction, then the initially selected device was not the correct device for executing the voice command.

Process flow 300 can save feedback 324 in database 312. In this illustrative example, feedback 324 can comprise both positive and negative results in voice command execution by voice command devices. Additionally, process flow 300 can also perform additional training for predicting future voice command execution.

The illustration of process flow 300 is provided as an example of one implementation for executing voice commands using a view of the location and user interface in the form of holographic interface 316. This illustration is not meant to limit the manner in which other illustrative examples can be implemented to manage the execution of voice commands using interfaces to visualize a location and the voice command direction. For example, another example can display the location and voice command direction using a two-dimensional or three-dimensional view displayed on a display system in place of the holographic display. In yet another illustrative example, more than one voice command device can be selected to execute the same voice command.

Figure 4:
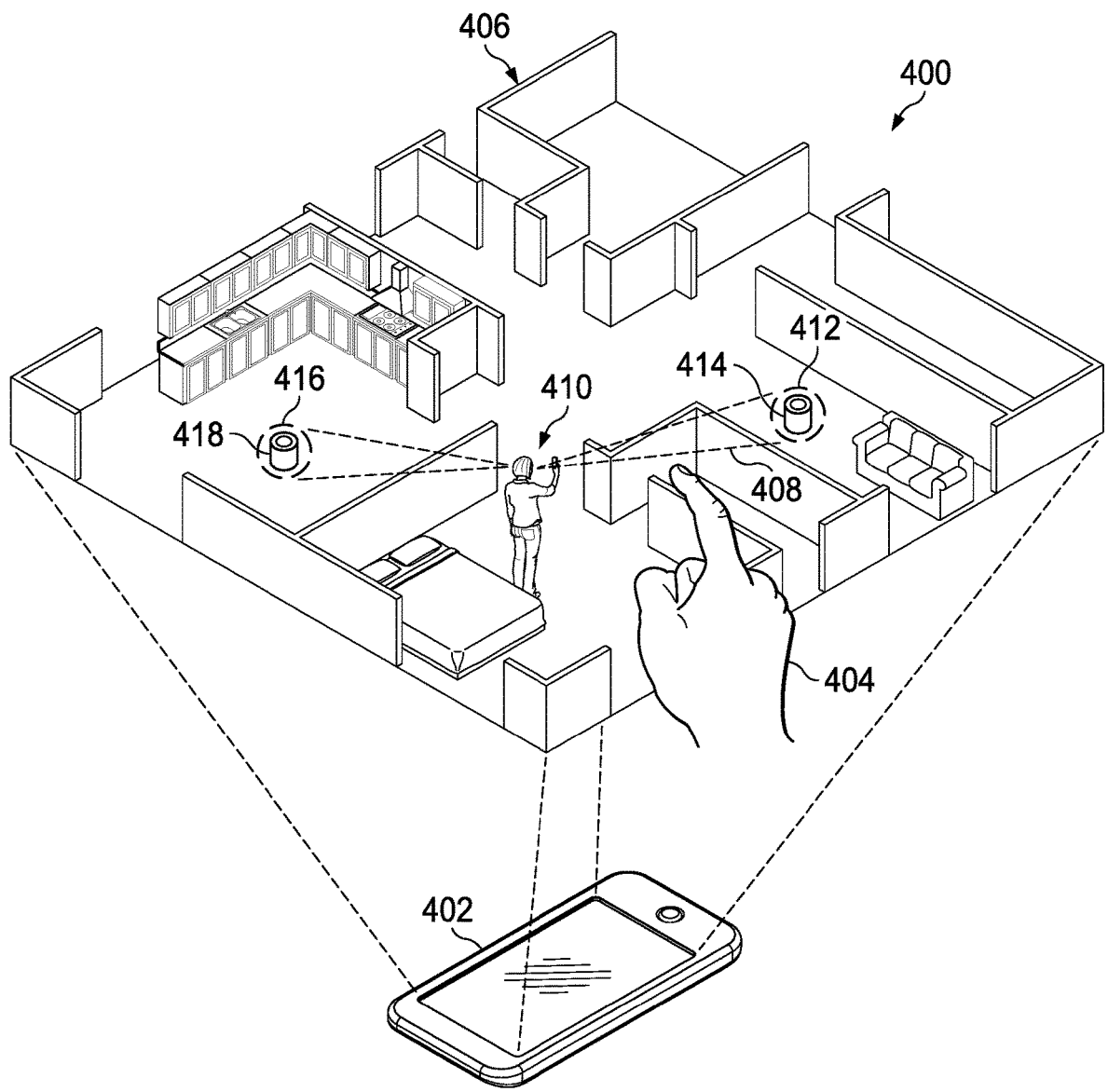
FIG. 4 is a pictorial illustration of a user interface in accordance with an illustrative embodiment.

Turning to FIG. 4, a pictorial illustration of a user interface is depicted in accordance with an illustrative embodiment. As depicted, holographic interface 400 is an example of one implementation for user interface 218 in FIG. 2. Smart phone 402 is an example of an implementation for computing device 224 in FIG. 2. As depicted, smart phone 402 includes a holographic display that operates to display holographic interface 400 to user 404.

In this illustrative example, holographic interface 400 is displayed in response to detecting a voice command from user 404. As depicted, holographic interface 400 displayed by smart phone 402 comprises a three-dimensional view in the form of hologram 406 of a house in which user 404 is located. If user 404 is in a different location such as an office, hologram 406 displayed is that of the office in which user 404 is located in place of the house. In addition to hologram 406 of the house, smart phone 402 displays graphical indicator 408 in hologram 406 in holographic interface 400 to indicate the voice command direction for a command to be executed. In other words, graphical indicator 408 provides a visualization of the direction of the voice command. Additionally, graphical indicator 408 can also identify the particular voice command device that is currently selected for executing the voice command.

As depicted, graphical indicator 408 has starting point 410 and ending area 412. Starting point 410 indicates the location of user 404 within the house. Ending area 412 identifies the voice command device that is currently identified for executing the voice command. In this example, area 412 encompasses smart speaker 414 indicating that smart speaker 414 is currently selected to execute the voice command.

In another illustrative example, in the area 412 may not encompass smart speaker 414. In this example, smart speaker 414 may be associated with a graphical indicator to indicate that smart speaker 414 is the selected voice command device for executing the voice command with the current voice command direction indicated by graphical indicator 408. For example, a graphical indicator can be a highlighting roof flashing graphic to draw attention to smart speaker 414.

If the user desires to have another voice command device execute the voice command, user 404 can interact with holographic interface 400 to change the direction of the voice command. In this illustrative example, smart phone 402 may also include position or gesture sensors to detect user 404 for interacting with graphical indicator 408 displayed in holographic interface 400.

For example, user 404 can manipulate graphical indicator 408 such that graphical indicator 408 has position 416. With position 416, the voice command direction identifies smart speaker 418 instead of smart speaker 414 as the selected voice command device to execute the voice command.

The illustration of holographic interface 400 displayed by smart phone 402 in FIG. 4 is not meant to limit the manner in which other illustrative examples can be implemented. For example, a different type of computing device can be used in place of smart phone 402. For example, holographic interface 400 can be displayed using a tablet computer, a smartwatch, a desktop computer, or some other suitable device that has holographic display capabilities. In yet another illustrative example, a three-dimensional view can be displayed on display screen on smart phone 402 in place of holographic interface 400.

Figure 5:
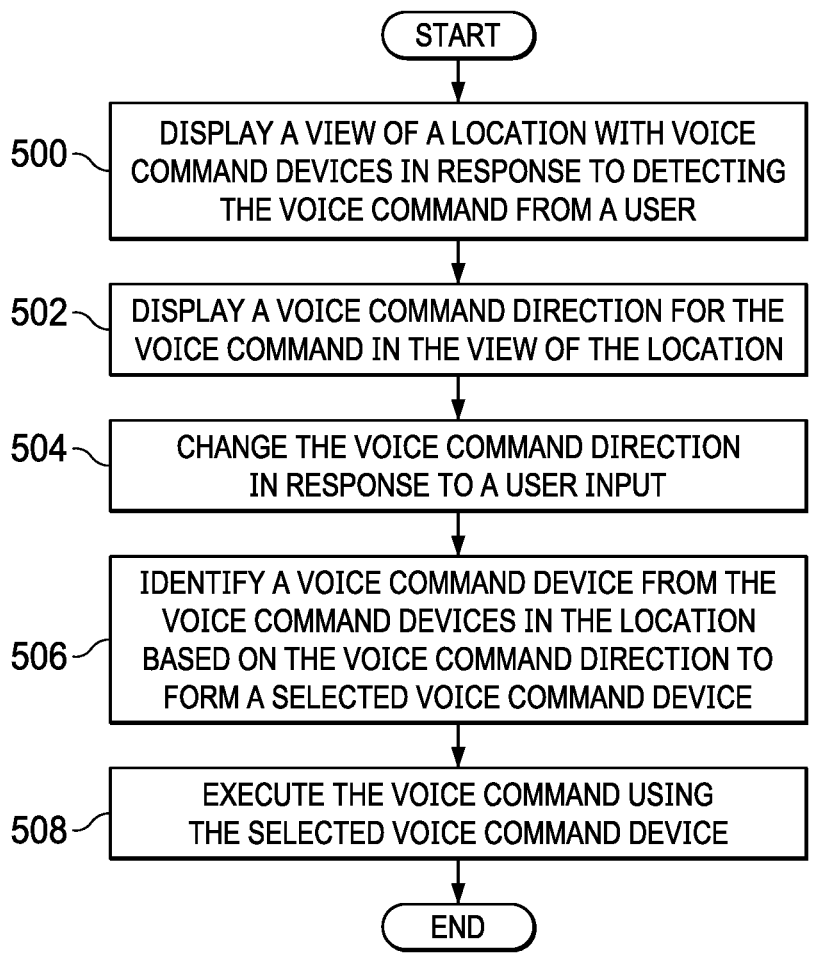
FIG. 5 is a flowchart of a process for executing a voice command in accordance with an illustrative embodiment.

Turning next to FIG. 5, a flowchart of a process for executing a voice command is depicted in accordance with an illustrative embodiment. The process in FIG. 5 can be implemented in hardware, software, or both. When implemented in software, the process can take the form of program instructions that is run by one of more processor units located in one or more hardware devices in one or more computer systems. For example, the process can be implemented in voice command processor 206 in computer system 204 in FIG. 2.

The process begins by displaying a view of a location with voice command devices in response to detecting the voice command from a user (step 500). The process displays a voice command direction for the voice command in the view of the location (step 502). In step 502, a computing device can be such as smart phone, a smart watch, a wearble IoT device, or some other suitable device.

The process changes the voice command direction in response to a user input (step 504). The process identifies a voice command device from the voice command devices in the location based on the voice command direction to form a selected voice command device (step 506). The process executes the voice command using the selected voice command device (step 508). The process terminates thereafter.

Figure 6:
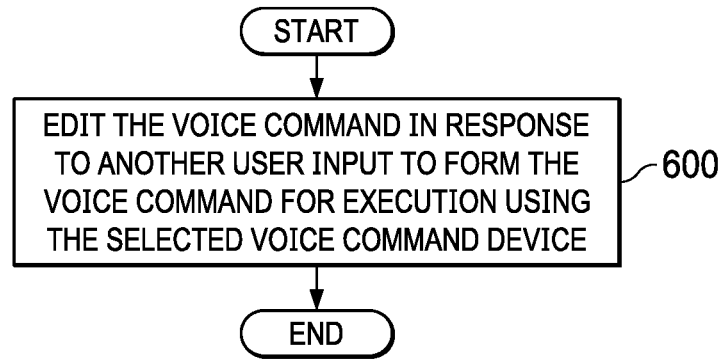
FIG. 6 is a flowchart of a process for editing a voice command in accordance with an illustrative embodiment.

With reference next to FIG. 6, a flowchart of a process for editing a voice command is depicted in accordance with an illustrative embodiment. The step in this flowchart is an example of a step that can be performed in the process in FIG. 5.

The process edits the voice command in response to another user input to form the voice command for execution using the selected voice command device (step 600). The process terminates thereafter.

Figure 7:
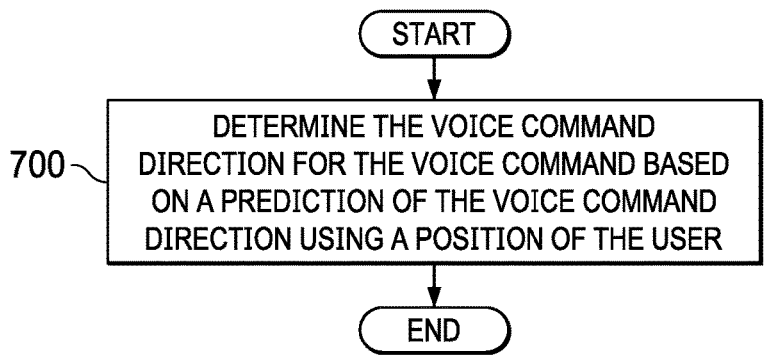
FIG. 7 is a flowchart of a process for determining a voice command direction in accordance with an illustrative embodiment.

With now to FIG. 7, a flowchart of a process for determining a voice command direction is depicted in accordance with an illustrative embodiment. The step in this flowchart is an example of a step that can be performed in the process in FIG. 5.

The process determines the voice command direction for the voice command based on a prediction of the voice command direction using a position of the user (step 700). The process terminates thereafter.

Figure 8:
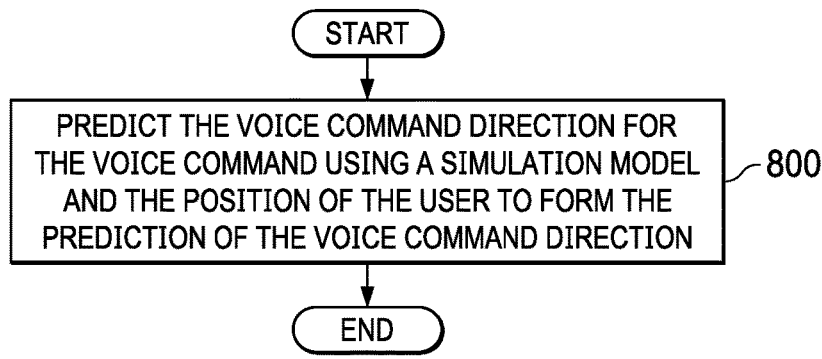
FIG. 8 is a flowchart of a process for predicting a voice command direction in accordance with an illustrative embodiment.

In FIG. 8, a flowchart of a process for predicting a voice command direction is depicted in accordance with an illustrative embodiment. The step in this flowchart is an example of a step that can be performed in the process in FIG. 7 to generate the prediction of the voice command direction.

The process predicts the voice command direction for the voice command using a simulation model and the position of the user to form the prediction of the voice command direction (step 800). The process terminates thereafter. In step 800, the simulation model is created using historical data of prior voice commands.

Figure 9:
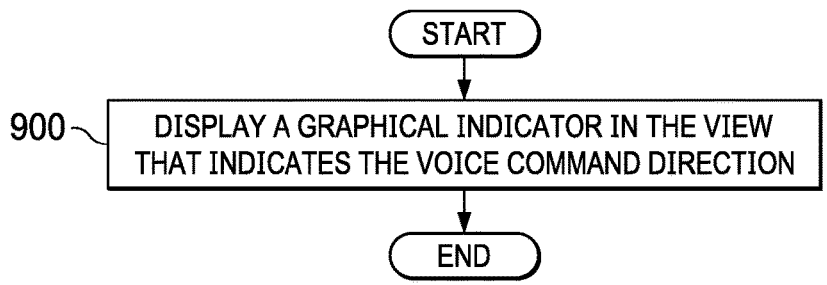
FIG. 9 is a flowchart of a process for displaying the voice command direction in accordance with an illustrative embodiment.

Turning now to FIG. 9, a flowchart of a process for displaying the voice command direction is depicted in accordance with an illustrative embodiment. The step in this flowchart is an example of an implementation of step 502 in FIG. 5.

The process displays a graphical indicator in the view that indicates the voice command direction (step 900). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 10:
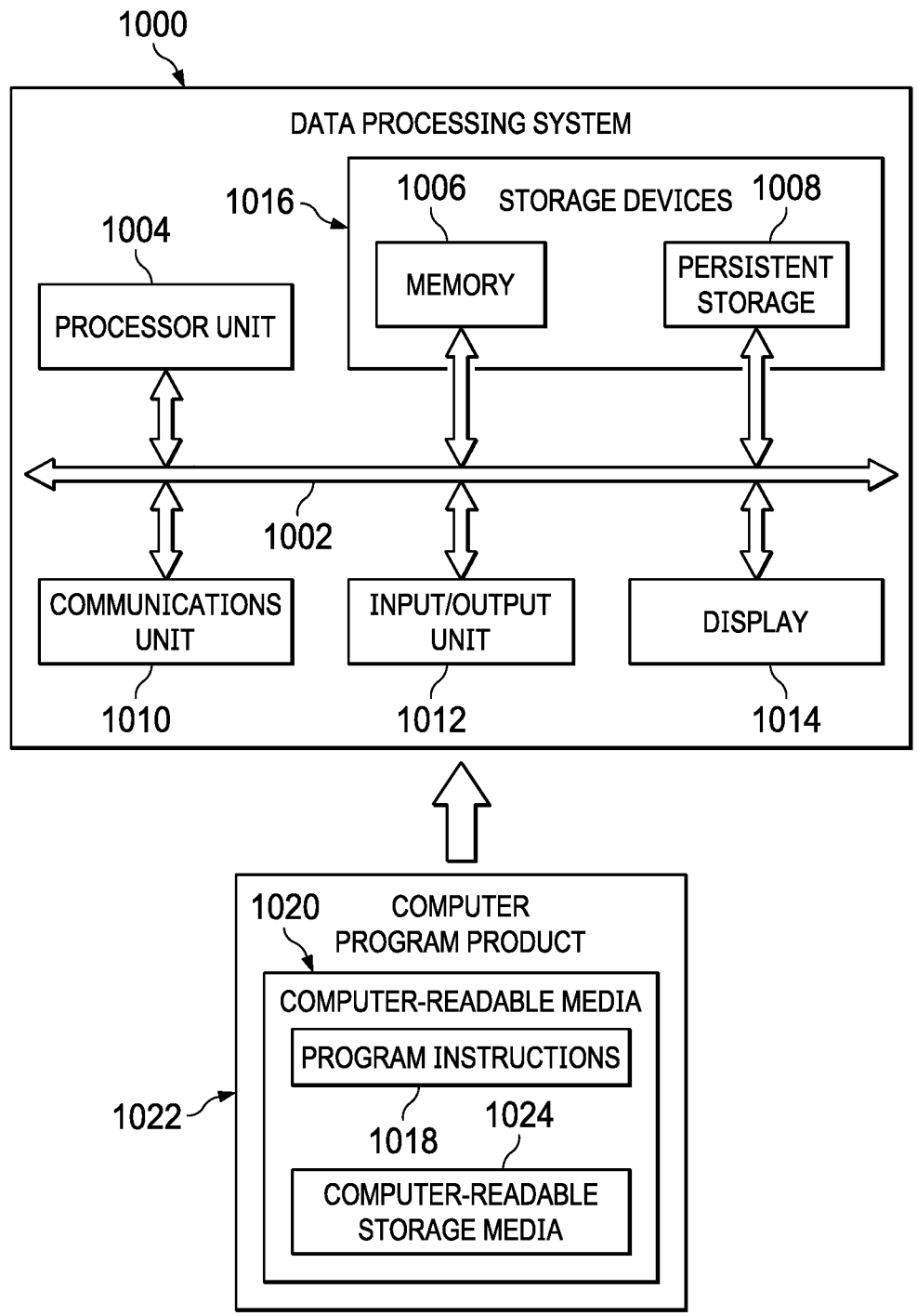
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement server computer 104, server computer 106, client devices 110, in FIG. 1. Data processing system 1000 can also be used to implement computer system 204 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program instructions, computer usable program instructions, or computer-readable program instructions that can be read and executed by a processor in processor unit 1004. The program instructions in the different embodiments can be embodied on different physical or computer-readable storage media, such as memory 1006 or persistent storage 1008.

Program instructions 1018 is located in a functional form on computer-readable media 1020 that is selectively removable and can be loaded onto or transferred to data processing system 1000 for execution by processor unit 1004. Program instructions 1018 and computer-readable media 1020 form computer program product 1022 in these illustrative examples. In the illustrative example, computer-readable media 1020 is computer-readable storage media 1024.

Computer-readable storage media 1024 is a physical or tangible storage device used to store program instructions 1018 rather than a medium that propagates or transmits program instructions 1018. Computer readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1018 can be transferred to data processing system 1000 using a computer-readable signal media. The computer-readable signal media are signals and can be, for example, a propagated data signal containing program instructions 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1020" can be singular or plural. For example, program instructions 1018 can be located in computer-readable media 1020 in the form of a single storage device or system. In another example, program instructions 1018 can be located in computer-readable media 1020 that is distributed in multiple data processing systems. In other words, some instructions in program instructions 1018 can be located in one data processing system while other instructions in program instructions 1018 can be located in one data processing system. For example, a portion of program instructions 1018 can be located in computer-readable media 1020 in a server computer while another portion of program instructions 1018 can be located in computer-readable media 1020 located in a set of client computers.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program instructions 1018.

Thus, illustrative embodiments provide a computer implemented method, computer system, and computer program product for executing a voice command. A number of processor units displays a view of a location with voice command devices in response to detecting the voice command from a user. The number of processor units displays a voice command direction for the voice command in the view of the location. The number of processor units changes the voice command direction in response to a user input. The number of processor units identifies a voice command device from the voice command devices in the location based on the voice command direction to form a selected voice command device. The number of processor units executes the voice command using the selected voice command device.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for executing a voice command, the method comprising:
   displaying, by a number of processor units, a view of a location on a holographic interface with voice command devices in response to detecting the voice command from a user;
   displaying, by the number of processor units, a starting voice command direction for the voice command in the view of the location on the holographic interface, wherein the starting voice command direction is visually displayed to show position for currently identified voice command device for executing the voice command from the user;

generating, by the number of processor units, a first cone on the holographic interface based on position for currently identified voice command device and the position of the user;

changing, by the number of processor units, the starting voice command direction in response to a user input to form an ending voice command direction;

identifying, the number of processor units, a voice command device from the voice command devices in the location on the holographic interface based on the ending voice command direction to form a selected voice command device;

generating, by the number of processor units, a second cone on the holographic interface based on position for the selected voice command device and the position of the user; and executing, by the number of processor units, the voice command using the selected voice command device.

2. The computer implemented method of claim 1 further comprising:

editing, by the number of processor units, the voice command in response to another user input to form the voice command for execution using the selected voice command device.

3. The computer implemented method of claim 1 further comprising:

determining, by the number of processor units, the ending voice command direction for the voice command based on a prediction of the voice command direction using a position of the user.

4. The computer implemented method of claim 3 further comprising:

predicting, by the number of processor units, the voice command direction for the voice command using a simulation model and the position of the user to form the prediction of the voice command direction, wherein the simulation model is created using historical data of prior voice commands.

5. The computer implemented method of claim 3, wherein the prediction of the voice command direction includes a voice command device for executing the voice command and a set of actions to be performed for the voice command.

6. The computer implemented method of claim 4 further comprising:

updating, by the number of processor units, the historical data for prior voice commands with the voice command direction used to execute the voice command in which the voice command direction was selected in response to the user input, wherein the simulation model is trained using the historical data to predict the voice command direction for the voice command.

7. The computer implemented method of claim 1, wherein displaying the voice command direction for the voice command in the view of the location comprises:

displaying, by the number of processor units, a graphical indicator in the view that indicates the voice command direction.

8. The computer implemented method of claim 1, wherein the view is selected from at least one of a three-dimensional view, a hologram a three-dimensional image, a two-dimensional view, or a two-dimensional image.

9. The computer implemented method of claim 1, wherein the voice command devices are selected from at least one of an IoT device, a smart device, a remote control, a television, a smart speaker, a smartphone, and a refrigerator.

10. The computer implemented method of claim 1, wherein the location is one of a house, a floor in the house, a room, an office, a work area in a building, a store, a warehouse, and a manufacturing floor.

11. A computer system comprising:

a number of processor units, wherein the number of processor units executes instructions to:

display a view of a location on a holographic interface with voice command devices in response to detecting a voice command from a user;

display a starting voice command direction for the voice command in the view of the location on the holographic interface, wherein the starting voice command direction is visually displayed to show position for currently identified voice command device for executing the voice command from the user;

generate a first cone on the holographic interface based on position for the currently identified voice command device and the position of the user;

change the starting voice command direction in response to a user input to form an ending voice command direction;

identify a voice command device from the voice command devices in the location on the holographic interface based on the ending voice command direction to form a selected voice command device;

generate a second cone on the holographic interface based on position for the selected voice command device and the position of the user; and execute the voice command using the selected voice command device.

12. The computer system of claim 11, wherein the number of processor units executes instructions to:

edit the voice command in response to another user input to form the voice command for execution using the selected voice command device.

13. The computer system of claim 11, wherein the number of processor units executes instructions to:

determine the voice command direction for the voice command based on a prediction of the voice command direction using a position of the user.

14. The computer system of claim 13, wherein the number of processor units executes instructions to:

predict the voice command direction for the ending voice command using a simulation model and a position of the user to form the prediction of the voice command direction, wherein the simulation model is created using historical data of prior voice commands.

15. The computer system of claim 13, wherein the prediction of the voice command direction includes a voice command device for executing the voice command and a set of actions to be performed for the voice command.

16. The computer system of claim 14, wherein the number of processor units executes instructions to:

update, by the number of processor units, the historical data for prior voice commands with the voice command made in response to the user input, wherein the simulation model is trained using the historical data to predict the voice command direction for the voice command.

17. The computer system of claim 11, in displaying the voice command direction for the voice command in the view of the location, wherein the number of processor units executes instructions to:

displays a graphical indicator in the view that indicates the voice command direction.

18. A computer program product for executing a voice command, the computer program product comprising a computer readable storage medium having program instructions embodied therewith, the program instructions executable by a computer system to cause the computer system to perform a method of:
- displaying, by a number of processor units, a view of a location on a holographic interface with voice command devices in response to detecting the voice command from a user;
- displaying, by the number of processor units, a starting voice command direction for the voice command in the view of the location on the holographic interface, wherein the starting voice command direction is visually displayed to show position for currently identified voice command device for executing the voice command from the user;
- generating, by the number of processor units, a first cone on the holographic interface based on position for the currently identified voice command device and the position of the user;
- changing, by the number of processor units, the starting voice command direction in response to a user input to form an ending voice command direction;
- identifying, the number of processor units, a voice command device from the voice command devices in the location on the holographic interface based on the ending voice command direction to form a selected voice command device;
- generating, by the number of processor units, a second cone on the holographic interface based on position for the selected voice command device and the position of the user; and
- executing, by the number of processor units, the voice command using the selected voice command device.

19. The computer program product of claim 18 further comprising:
- editing, by the number of processor units, the voice command in response to another user input to form the voice command for execution using the selected voice command device.

20. The computer program product of claim 18 further comprising:
- determining, by the number of processor units, the ending voice command direction for the voice command based on a prediction of the voice command direction using a position of the user.

* * * * *